(12) United States Patent
Matzat et al.

(10) Patent No.: US 8,220,114 B2
(45) Date of Patent: Jul. 17, 2012

(54) PULL-DOWN FASTENING DEVICE FOR FASTENING OBJECTS HAVING BORES

(75) Inventors: Hendric Matzat, Rebensgrun (DE); Klaus Richter, Laubach (DE)

(73) Assignee: Ludwig Ehrhardt GmbH (DE)

( * ) Notice: Subject to any disclaimer, the term of this patent is extended or adjusted under 35 U.S.C. 154(b) by 925 days.

(21) Appl. No.: 12/189,256

(22) Filed: Aug. 11, 2008

(65) Prior Publication Data

US 2009/0044386 A1     Feb. 19, 2009

(30) Foreign Application Priority Data

Aug. 15, 2007    (DE) ..................... 10 2007 038 656

(51) Int. Cl.
     *B23Q 3/06*         (2006.01)
(52) U.S. Cl. ............... 24/458; 24/463; 269/48.1
(58) Field of Classification Search .............. 269/47–52; 294/93, 158; 279/2.17; 24/463, 458
See application file for complete search history.

(56) References Cited

U.S. PATENT DOCUMENTS

| 6,095,509 | A | 8/2000 | Yonezawa |
| 2006/0033255 | A1 | 2/2006 | Yonezawa |
| 2006/0049568 | A1 | 3/2006 | Yonezawa |
| 2006/0049569 | A1 | 3/2006 | Yonezawa |
| 2006/0131803 | A1 | 6/2006 | Yonezawa |

FOREIGN PATENT DOCUMENTS

| DE | 4020981 | 1/1992 |
| DE | 29500115 | 2/1995 |
| DE | 10312192 | 8/2004 |
| DE | 102004006213 | 8/2005 |
| DE | 102005009177 | 9/2006 |
| EP | 0785049 | 7/1997 |
| EP | 1600261 | 11/2005 |

*Primary Examiner* — James Brittain
(74) *Attorney, Agent, or Firm* — Schmeiser, Olsen & Watts, LLP

(57) ABSTRACT

Disclosed herein is a pull-down fastening device for objects having bores, with a fastening unit which includes a fastening element. A pull-down fastening device is disclosed, with which the various fastening processes can, when necessary, be performed. For this purpose, the pull-down fastening device features a modular interchangeable fastening insert which insert includes a fastening element. Such pull-down fastening devices engage into bores of, for example, pallets or workpieces to be processed, for the purpose of interior fastening.

16 Claims, 4 Drawing Sheets

PULL-DOWN FASTENING DEVICE FOR FASTENING OBJECTS HAVING BORES

This application is based on German patent application number DE 10 2007 038 656.9.

BACKGROUND OF INVENTION

1. Technical Field

The invention relates to a pull-down fastening device for fastening objects having bores, with a fastening unit which includes a fastening element.

2. Related Art

These kinds of pull-down fastening devices are used for interior gripping or fastening in bores of objects. For example, pallets or workpieces to be processed can be fastened in this manner.

German Patent DE 10 2004 006 213 B3 shows this kind of a pull-down fastening device with which objects can be fastened at a defined fixed point or zero-point. For this purpose, the fastening element is directed quite snugly within the fastening unit. There are also, however, pull-down fastening devices by which the fastening elements enable an adjustment, so that the tolerances can be balanced out with the inner bore to be fastened. Some of these kinds of adjustment options are designed to be one-dimensional, so that the fastening element can move in one direction. There are also, however, pull-down fastening elements which enable two-dimensional adjustment.

The unfortunate aspect of pull-down fastening elements generally is that for the different kinds of fastening-namely, either zero-point fastening, or one- or two-dimensional adjustment-there are different building principles and therewith also dimensions between the individual elements. To correct fastening on the side of or in the workpiece, elements of great dimensions are normally required at the activity site. Through various functioning principles, a uniform design of the fastening bore inside the workpiece is impossible or at least very difficult.

The underlying problem of the invention is to claim a pull-down fastening device with which the various fastening processes can, when necessary, be performed.

SUMMARY OF INVENTION

The problem with the pull-down fastening device of the above-mentioned type is solved through a modular interchangeable fastening insert, which includes the fastening element. In this way, the same fastening unit with modular interchangeable fastening inserts can be used with the pull-down fastening device with the inventive features. Through the selection of the desired fastening units, the desired fastening technology can be obtained. One receives such a uniform foundational module commensurate with the present element construction size, which module is suitable for a conversion between fixed-point and balancing-point fastening by means of changeable inserts. Only small dimensions at the activity site are required, and it allows a cost-effective fastening ring to be used as a contact element to the workpiece. Further advantages following from the invention are an improved sealing of the system against penetration of filth, and simple maintenance.

A further improvement of the invention features several varied fastening inserts. Due to these several varied fastening inserts, for every fastening technology, the suitable fastening insert holds itself ready so that the modular switch can take place quickly and comfortably.

Preferably, the fastening element is firmly connected with the fastening insert. In this way, a fixed position of the fastening site arises simply and surely-the so-named zero-point.

It is, however, also possible that the fastening element is movably connected with the fastening insert. For example, the fastening element can be swivelably connected with the fastening insert about an axis perpendicular to the fastening direction. In this way there arises simply and functionally an adjustment option for the position of the fastening bore during fastening.

An advantageous embodiment of the invention features the fastening insert being equipped for replacement or re-positioning into a starting position when the fastening is released. In this manner, an adjustment by fastening is on the one hand possible, whereby the fastening insert is always re-positioned or replaced at the starting position for the arranging of the workpiece on top of the pull-down fastening device. In this manner the arrangement of a workpiece on top of the pull-down fastening device is facilitated.

Another improvement of the invention features the fastening element including a fastening ring and a tie-rod. Preferably the fastening element includes, in addition to that, a tapered insertable collar, which has a cone or taper corresponding to and designed to interact with the fastening ring. In this way, the fastening ring can, through the pulling down of the tie-rod by means of the cone, be expanded for fastening. In addition to that, it is advantageous when a bushing is designed for the tapered insertable collar. The bushing can, for example, ensure a secure fit of the tapered insertable collar. In this manner, zero-point fastening is advantageously supported. It is however, also possible that the bushing enables an adjustment to the tapered insertable collar. For example, the bushing can enable a one- or two-dimensional adjustment to the tapered insertable collar. In connection with the moving connection between the fastening element and the fastening insert there arises such a simple, effective, yet reliable balancing mechanism with a simultaneous reliable fastening effect.

In another embodiment of the invention, the fastening unit has a drive piston, in particular, a hydraulic drive piston. Utilization of this kind of drive piston can generate a large amount of reliable and simple fastening strength. In one improvement, the drive piston is arranged parallel to the fastening insert. Since in this case the piston movement and the fastening movement of the fastening insert are parallel, an especially thin structure can be obtained. It is, in addition, advantageous when the drive piston is mechanically coupled with the fastening insert, in particular, when the drive piston is positively coupled therewith. Thereby, a good coupling and a solid power transmission can be obtained. Advantageously, the drive piston can be coupled with the fastening insert by means of a pin. A coupling of this kind can be easily disassembled, and after the change of the fastening insert, put firmly back together.

BRIEF DESCRIPTION OF THE DRAWINGS

Following, examples of embodiments of the invention will be explained in more detail, wherein.

DETAILED DESCRIPTION OF THE INVENTION

Figure 1:
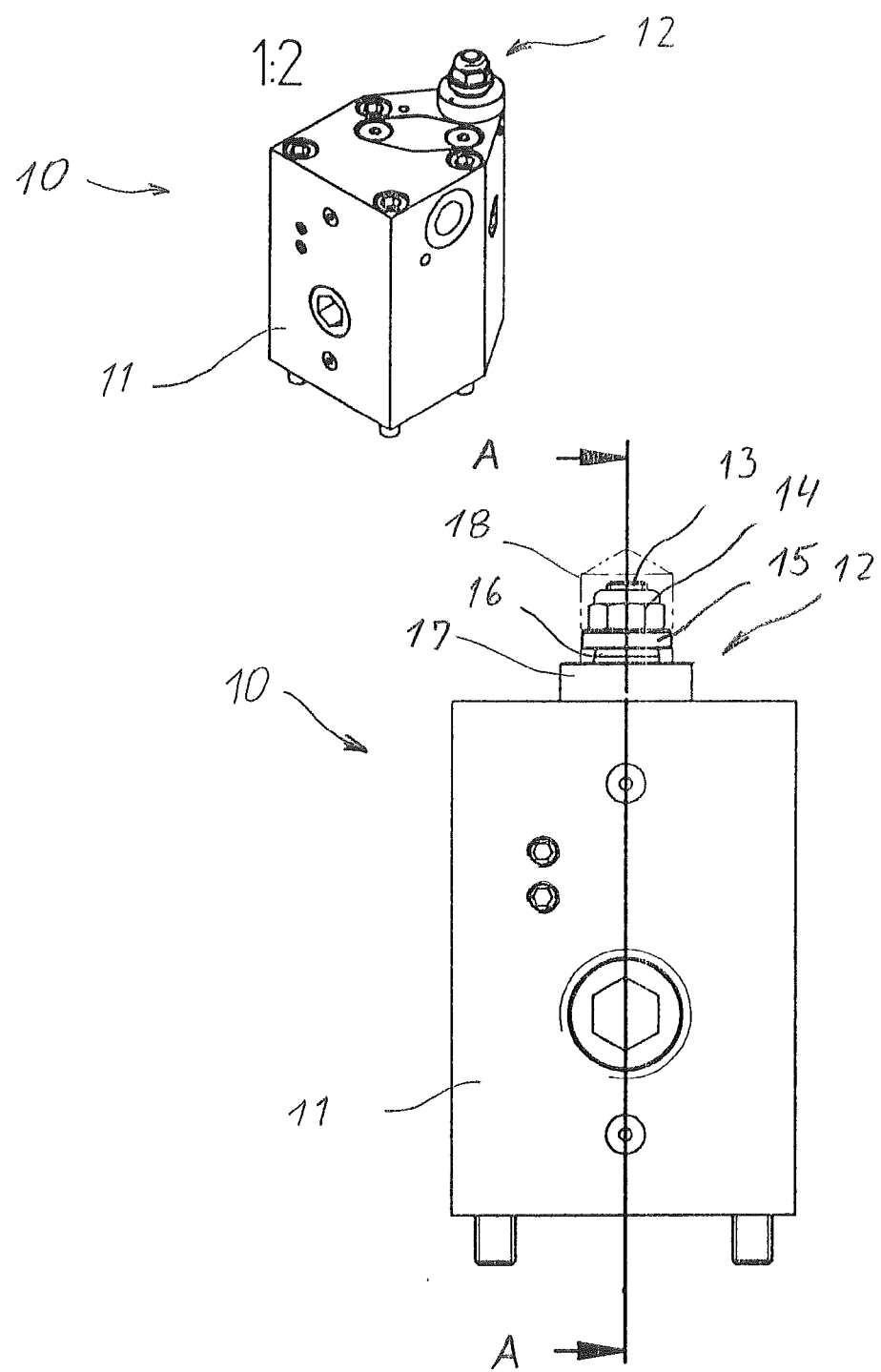
FIG. 1 depicts a perspective top view and a front view of a pull-down fastening device with the inventive features.

FIG. 1 shows in the upper part a perspective top view of a pull-down fastening device 10 as a first example of an embodiment with the inventive features. In the lower part, FIG. 1 shows a front view of the pull-down fastening device 10. As can be inferred from the figure, the pull-down fastening device 10 includes a fastening unit 11 with a fastening element 12 arranged therein. The fastening element 12 has a tie-rod 13 on to which a nut 14 is screwed. On the underside of the nut 14 a fastening ring 15 is arranged, which engages with a tapered insertable collar 16 for the purpose of fastening. The tapered insertable collar 16 is in turn arranged in a bushing 17 for the purpose of fastening. In the figure, a bored hole 18 is indicated by broken lines in a workpiece represented from farther away. For the purpose of fastening inside of the bored hole 18, the tie-rod 13 is moved downward in the figure, in a known way. When the tapered insertable collar 16 is hit inside of the bushing 17, the tapered insertable collar 16 and the fastening ring 15 are forced apart. Through the separation of the fastening ring 15 inside of the bore 18, the workpiece is then firmly fastened.

Figure 2:
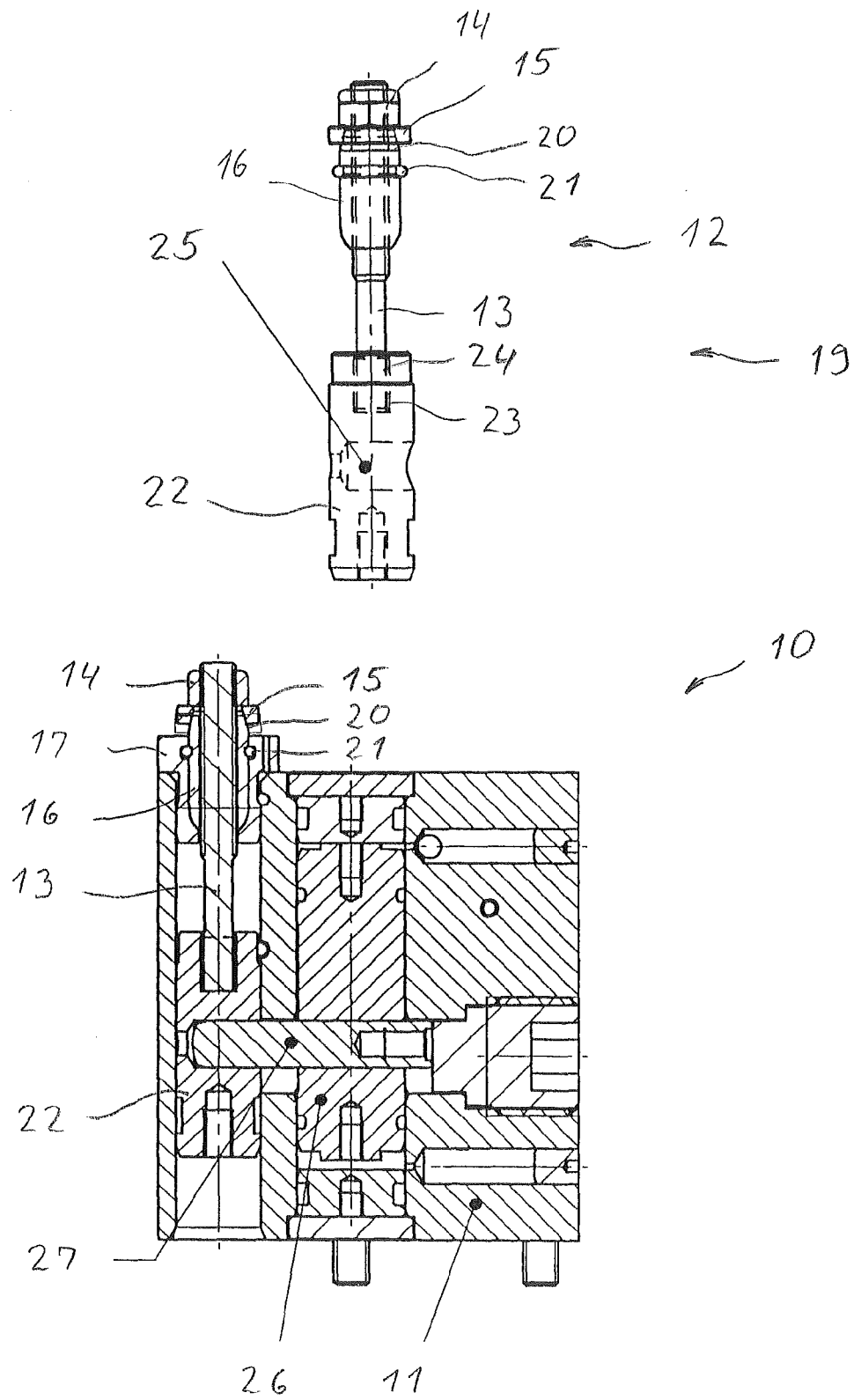
FIG. 2 depicts the cross-section A-A of FIG. 1 and a detailed presentation of the fastening insert from FIG. 1.

FIG. 2 shows the cross-section A-A from FIG. 1. In addition, in the upper part of FIG. 2 the fastening element 12 is depicted in a detailed presentation. As can be inferred from the figure, the fastening element 12 is fashioned as a part of a fastening insert 19. In the detailed depiction of the fastening insert 19, it should also be recognized that the tapered insertable collar 16 facing the fastening ring 15 includes a cone 20 for the purpose of spreading apart the fastening ring 15. In addition, an O-ring 21 is arranged in a groove of the tapered insertable collar 16, surrounding the tapered insertable collar 16.

The fastening insert 19 also includes a fastening body 22 with a body-threaded portion 23, which threadably engages the tie-rod-threaded portion 24 on the end of the tie-rod 13 being spaced away from and not facing the nut 14. In particular, the tie-rod 13 is by means of the threaded portions 23, 24 firmly connected with the fastening body 22. In can further be inferred from FIG. 2 that the fastening body 22 includes a bore 25 perpendicular to the tie-rod 13.

As can be inferred from the portrayed cross-section A-A at the bottom of FIG. 2, a drive piston 26 is arranged in the fastening unit 11, which can be pressurized with a hydraulic liquid. The drive piston 26 is arranged parallel to the fastening insert 19 and is connected with the fastening body 22. In particular, the drive piston 26 is mechanically, especially positively, connected with the fastening body 22. As can be inferred from the Figure the drive piston 26 is connected to the fastening body 22 by means of a pin 27.

According to the present embodiment, the tie-rod 13 is firmly connected with the fastening body 22. Similarly, the tapered insertable collar 16 is firmly mounted inside the bushing 17, and the tie-rod 13 is directed quite snugly within the tapered insertable collar 16. In this way, by means of the fastening insert 19 and the bushing 17, a so-named zero-point fastening is accomplished, by which the bore 18 is snugly fastened in a defined position to the pull-down fastening device 10.

Figure 3:
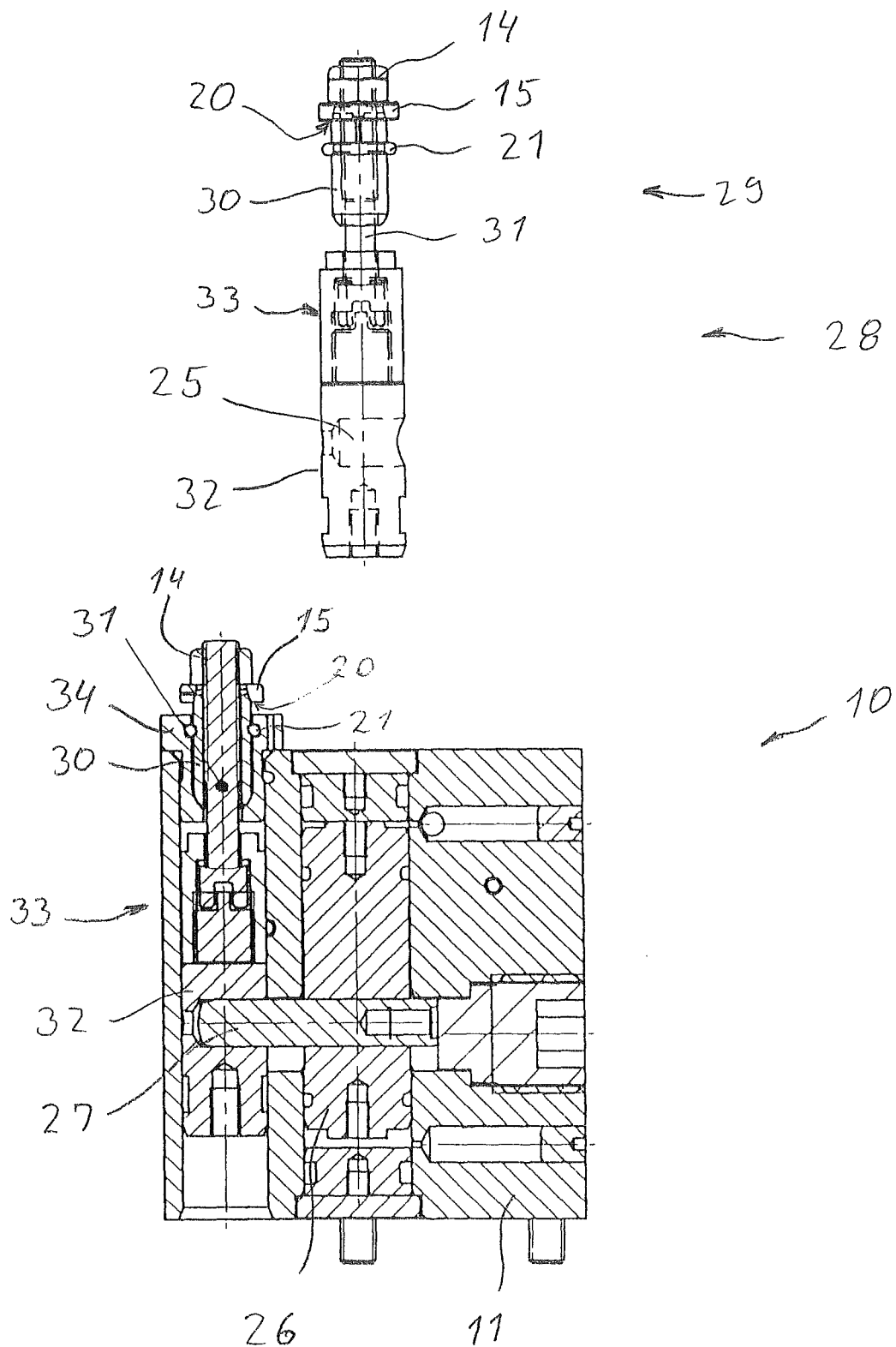
FIG. 3 depicts a second example of an embodiment, similar to FIG. 2.

FIG. 3 shows a second example of embodiment of the pull-down fastening device 10 with inventive features. The same elements carry the same reference numbers. In the present example of embodiment, into the fastening unit 11 is inserted a fastening insert 28 instead of the fastening insert 19.

The fastening insert 28 can be seen in detail in the upper part of FIG. 3. As can be inferred from the Figure, the fastening insert 28 includes a fastening element 29, similar to the fastening element 12. The functionality of the fastening element 29 is essentially the same as that of fastening element 12. But, unlike fastening element 12, fastening element 29 has a tapered insertable collar 30 similar to the tapered insertable collar 16, a tie-rod 31 and a fastening body 32. In this example of embodiment, the tie-rod 31 is movably connected with the fastening body 32. In particular, the tie-rod 31 is connected with the fastening body 32 by means of a swivel connection. As can further be inferred from the Figure, the fastening unit 11 includes a bushing 34, similar to the bushing 17. The bushing 34 is different from the bushing 17 in that an adjustment of the tie-rod 31 is possible for the purpose of fastening. In particular, the connection 33, and the combination of the tapered insertable collar 30 and the bushing 34, facilitates a swiveling motion of the tie-rod 31 about an oriented axis in the ambit of the connection 33 transverse to the tie-rod 31, which is not represented in the figure and lies in the plane of the paper.

Figure 4:
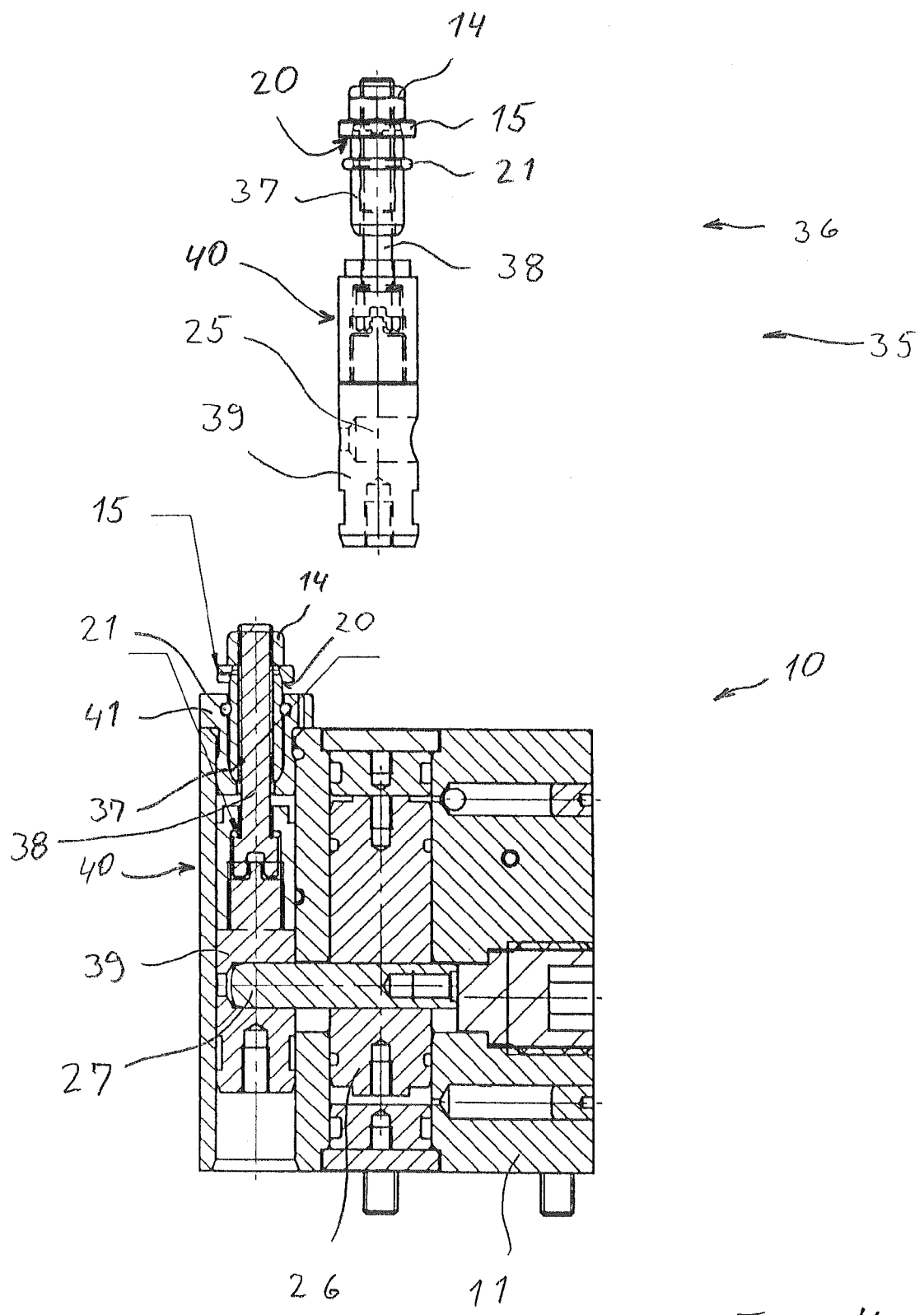
FIG. 4 depicts a further example of an embodiment, similar to FIG. 2.

FIG. 4 shows a further example of embodiment of the pull-down fastening device 10 with inventive features. In the bottom part of FIG. 4 the cross-section A-A can again be seen, while in the above part a fastening insert 35 similar to the fastening inserts 19, 28 is shown in detail. The fastening insert 35 is essentially the same as the fastening inserts 19, 28. Unlike these, the fastening insert 35 includes a fastening element 36 with a tapered insertable collar 37 and a tie-rod 38, said tie-rod being movably connected with a fastening body 39, by means of a connection 40. In particular the tie-rod 38 is connected cardanically by means of a gimbals with the fastening body 39. In this way, an unrestricted swiveling motion of the tie-rod 38 about the axes transverse to the fastening body 39 in the ambit of the connection 40 is enabled. A similar movable connection can, for example, also be obtained through a ball-and-socket joint. As can be inferred from the cross-section A-A in the lower part of FIG. 4, the fastening unit 11 has a bushing 41. The bushing 41 works together with the tapered insertable collar 37 and the tie-rod 38 of the type that an adjustment of the tie-rod 38 is possible, in order to fasten according to the connection 40 in the form of a swiveling motion of the tie-rod 38 in the plane of the paper as well as perpendicular thereto.

LIST OF REFERENCE NUMBERS 10. pull-down fastening device
11. fastening unit
12. fastening element
13. tie-rod
14. nut
15. fastening ring
16. tapered insertable collar
17. bushing
18. bore
19. fastening insert
20. cone (or taper)
21. O-ring
22. fastening body
23. body-threaded portion
24. tie-rod-threaded portion
25. bore
26. drive piston
27. pin
28. fastening insert
29. fastening element 30. tapered insertable collar
31. tie-rod
32. fastening body
33. connection
34. bushing
35. fastening insert
36. fastening element
37. tapered insertable collar
38. tie-rod
39. fastening body
40. connection
41. bushing

What is claimed is:

1. A pull-down fastening device for the fastening of objects having bores, the pull-down fastening device comprising:
a fastening unit featuring a modular interchangeable fastening insert, wherein the modular interchangeable fastening insert includes a fastening element, wherein the fastening unit has a drive piston, wherein said drive piston is arranged parallel to the fastening element, and wherein said drive piston is mechanically coupled with the fastening insert by means of a pin.

2. The pull-down fastening device according to claim 1, having several varied fastening inserts.

3. The pull-down fastening device according to claim 1, wherein the fastening element is firmly connected with the fastening insert.

4. The pull-down fastening device according to claim 1, wherein the fastening element is movably connected with the fastening insert.

5. The pull-down fastening device according to claim 4, wherein the fastening element is swivelably connected with the fastening insert, wherein the fastening element can swivel about an axis perpendicular to the direction of fastening.

6. The pull-down fastening device according to claim 1, wherein the fastening insert is equipped for replacement into the starting position when the fastening is released.

7. The pull-down fastening device according to claim 1, wherein the fastening element includes:
a fastening ring;
and a tie-rod.

8. The pull-down fastening device according to claim 7, wherein the fastening element includes:
a tapered insertable collar, which has a taper designed to interact with the fastening ring.

9. The pull-down fastening device according to claim 8, having a bushing for the tapered insertable collar.

10. The pull-down fastening device according to claim 9 wherein the bushing ensures a secure fit of the tapered insertable collar.

11. The pull-down fastening device according to claim 9, wherein the bushing enables an adjustment to the tapered insertable collar.

12. The pull-down fastening device according to claim 11, wherein the bushing enables a one- or two-dimensional adjustment to the tapered insertable collar.

13. The pull-down fastening device according to claim 1, wherein the drive piston is a hydraulic drive piston.

14. The pull-down fastening device according to claim 1, wherein the drive piston is positively coupled with the fastening insert.

15. A pull-down fastening device for the fastening of objects having bores, the pull-down fastening device comprising:
a fastening unit featuring a modular interchangeable fastening insert, wherein the modular interchangeable fastening insert includes a fastening element, wherein the fastening element includes:
a fastening ring;
a tie-rod;
a tapered insertable collar, which has a taper designed to interact with the fastening ring;
wherein the pull-down fastening device further comprises a bushing for the tapered insertable collar, wherein the bushing enables an adjustment to the tapered insertable collar.

16. The pull-down fastening device according to claim 15, wherein the bushing enables a one- or two-dimensional adjustment to the tapered insertable collar.

* * * * *